United States Patent [19]

Claas et al.

[11] 4,312,365

[45] Jan. 26, 1982

[54] HARVESTER THRESHER

[75] Inventors: Helmut Claas; Franz Tophinke, both of Harsewinkel, Fed. Rep. of Germany

[73] Assignee: Claas OHG, Harsewinkel, Fed. Rep. of Germany

[21] Appl. No.: 152,582

[22] Filed: May 23, 1980

[30] Foreign Application Priority Data

Jun. 7, 1979 [DE] Fed. Rep. of Germany ....... 2923022

[51] Int. Cl.³ .................... A01F 7/04; A01F 12/28
[52] U.S. Cl. .................... 130/27 P; 130/27.5
[58] Field of Search .................. 130/27 P, 27 Q, 27 S, 130/27 R; 56/14.6

[56] References Cited

U.S. PATENT DOCUMENTS

| 88,092 | 3/1869 | Stacy | 130/27 P |
|---|---|---|---|
| 253,874 | 2/1882 | MacDonald et al. | 130/27 P |
| 269,532 | 12/1882 | McKnight | 130/27 P |
| 324,997 | 8/1885 | Hershberger | 130/27 R |
| 1,625,953 | 4/1927 | Lundquist | 130/27 P |
| 3,545,185 | 12/1970 | Whitfield et al. | 56/14.6 |
| 3,983,883 | 10/1976 | Ashton et al. | 130/27 P |
| 4,165,751 | 8/1979 | Todd | 130/27 S |

FOREIGN PATENT DOCUMENTS 219310 9/1968 U.S.S.R. ............................. 130/27 P

*Primary Examiner*—Paul J. Hirsch
*Attorney, Agent, or Firm*—Michael J. Striker

[57] ABSTRACT

A harvester thresher has threshing elements and a plurality of separating elements each including a separating drum and a separating element located below the drum and provided with perforations and rubbing projections, a plurality of pairs of lateral wall members laterally limiting and holding a respective one of the separating elements, and a bar-shaped elongated supporting element extending in the direction of transportation, so that the separating elements are arranged on and shiftable over the supporting element as units.

24 Claims, 4 Drawing Figures

HARVESTER THRESHER

BACKGROUND OF THE INVENTION

The present invention relates to a vibration-three, preferably self-propelling harvester thresher with threshing drum, threshing bucket and several separating drums located adjacent to one another in the direction of transportation and provided with separating elements below the separating drums.

Harvester threshers of the above-mentioned general type are known in the art. Known harvester threshers possess some disadvantages inasmuch as they do not completely satisfy the requirements of performing in a satisfactory manner a substantially complete and fine separation of residual grain and providing easy access to the respective structural elements.

SUMMARY OF THE INVENTION

Accordingly, it is an object of the present invention to provide a harvester thresher which avoids the disadvantages of the prior art.

More particularly, it is an object of the present invention to provide a harvester thresher that satisfies the requirements of substantially full and fine separation of residual grain and of easy access to the respective structural elements, in a satisfactory manner.

In keeping with these objects and with others which will become apparent hereinafter, one feature of the present invention resides, briefly stated, in a harvester thresher in which separating elements are formed as perforated trough-shaped sheet members provided with rubbing projections parallel to the axis of separating drums, wherein a plurality of pairs of lateral wall members are provided, each laterally limiting and holding a respective one of the separating elements, which are supported in turn on bar-shaped elongated supporting members extending in the longitudinal direction of the harvester thresher so that the separating elements are arranged on and shiftable over the supporting members as units of a modular system.

In accordance with a further feature of the present invention, the supporting members are adjustable in an upright direction, or more particularly mounted on the lateral walls of the harvester thresher, adjustable in the upright direction. The supporting members may be formed as box-shaped members with a closed contour. Such a construction has an advantage in the fact that it provides for easy exchangeability and cleaning of the separating elements.

In accordance with still another advantageous feature of the present invention, two adjacent separating elements are centered and locked to one another via the lateral wall members. It is advantageous when the lateral wall members are formed as angle members having one end provided with a centering pin and the other end provided with a console with an opening.

In accordance with a further feature of the prevent invention, transferring fingers or sheet members are arranged between the separating elements in the gaps there between so as to at least partially overlap the gaps.

The separating elements and/or the separating drums correspond to the various harvest products and are exchangeable, and the separating elements have perforations and rubbing projections corresponding to the respective harvest products.

In accordance with still a further feature of the present invention, all separating elements can be tightened against one another and against abutting members mounted on the supporting members. The tightening elements may be formed, for example, as spring-biased brackets.

In accordance with yet a further feature of the present invention, the rearmost separating element and the rearmost separating drum, as considered in the direction of transportation, are spaced from one another so as to form a gap therebetween, and the rearmost separating element is arranged so that the harvest product passing through the above-mentioned gap, is discharged from the harvester thresher substantially parallel to the supporting members.

When the harvest product is of the type which has large grains, it is advantageous for the perforations of the separating elements to be elongated.

The novel features of the present invention which are considered as characteristic are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
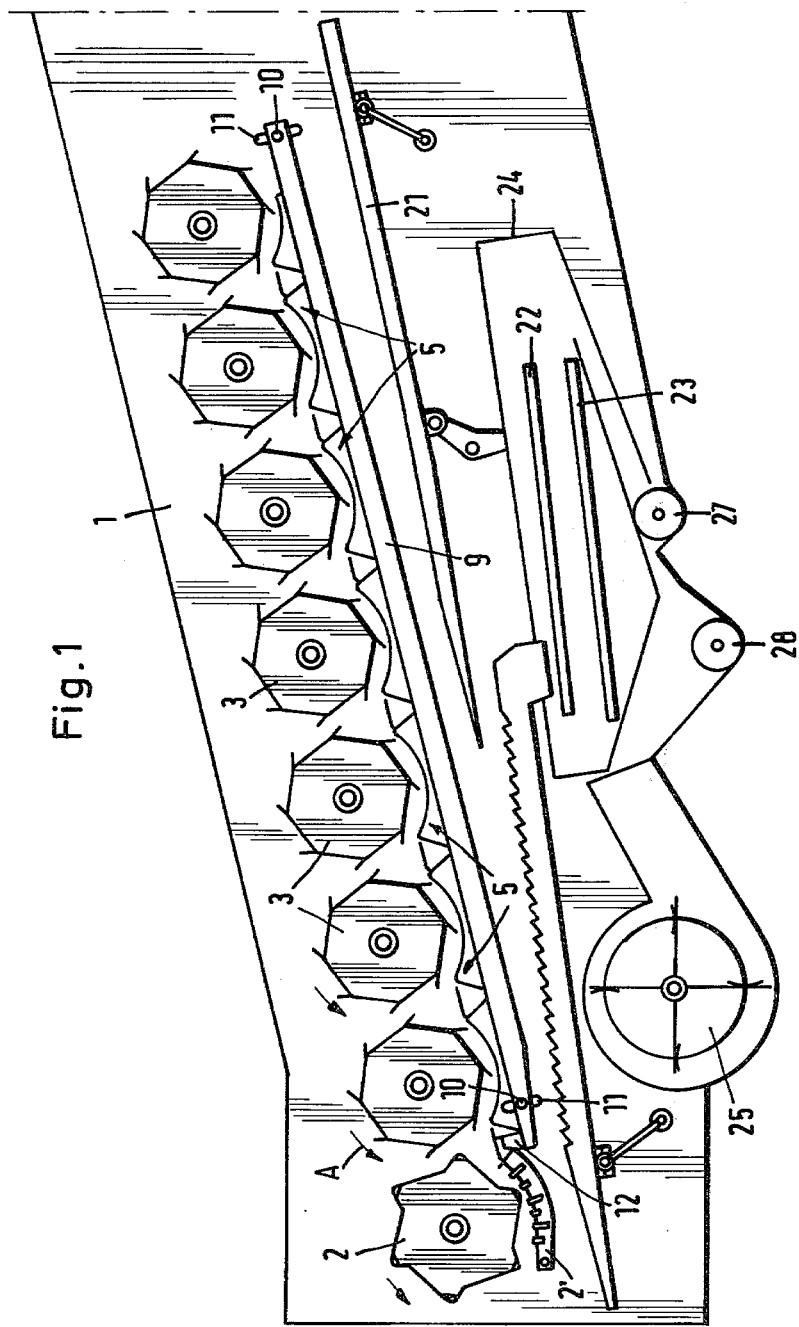
FIG. 1 is a plan view showing a threshing and separating part of a harvester thresher in accordance with the present invention.

A harvester thresher in accordance with the present invention has lateral walls which are identified by reference numeral 1. It has a threshing drum 2 with its threshing bucket 2', and a plurality of separating drums 3 arranged rearwardly of the threshing bucket as considered in direction of transportation.

A plurality of separating elements 5 are provided, each located below a respective one of the separating drums. Each separating element 5 is bent so as to assume a trough-shaped configuration. Each separating element 5 includes a metal sheet body provided with elongated openings 6 in its separation region and with rubbing projections 7 which extend parallel to the axes of the separating drums 3. In order to provide for stability, both lateral sides of each separating element 5 are fixedly connected with lateral limiting elements which are formed as a support and composed of angle members 8.

As can be seen from FIG. 1, supporting members 9 are mounted on the lateral walls 1 of the not completely shown harvester thresher. Mounting is performed with the aid of elongated openings 11 and screws 10 extending therethrough.

Because of the elongated openings 11, the supporting members 9 can change their location relative to the separating drums 3. This feature is of a great importance in the case of exchange of the separating drums 3 or installation of smaller separating drums. In this case, the supporting members 9 must be displaced downwardly. It is also possible to change the inclination of the supporting members 9. By changing the inclination of the supporting members 9 an extremely friction-free and fine passage of the respective harvest products can be attained. This also facilitates the exchange of the separating elements 5.

For the purpose of mounting, the angle members 8 which support the separating elements 5 can be shifted over the supporting members 9 from the rear side of the harvester thresher, as considered in the direction of transportation, so they will abut against one another and against abutments 12. The abutments 12 are provided on the supporting members 9. Then, the separating elements 5 are pressed against one another by two spring-biased tightening brackets 13. Exact fixed location of the separating elements 5 relative to one another is attained by the provision of consoles 15 and 17 arranged at opposite ends of each of the angle members 8 and having an opening 14 or the centering pin 16, respectively. The centering pin 16 of one angled member 8 extends through the opening 14 of the console 15 of the neighboring angle member 8.

This is not true for the opening 14 of the console 15' of the left angle member 8', as considered in the direction of transportation. In the latter-mentioned case, the tightening bracket 13 has a bent end portion 13' which engages through the opening 14 and presses all angle members 8 and 8' together and against the abutment 12, via an abutment 19 and a spring 20.

Figure 2:
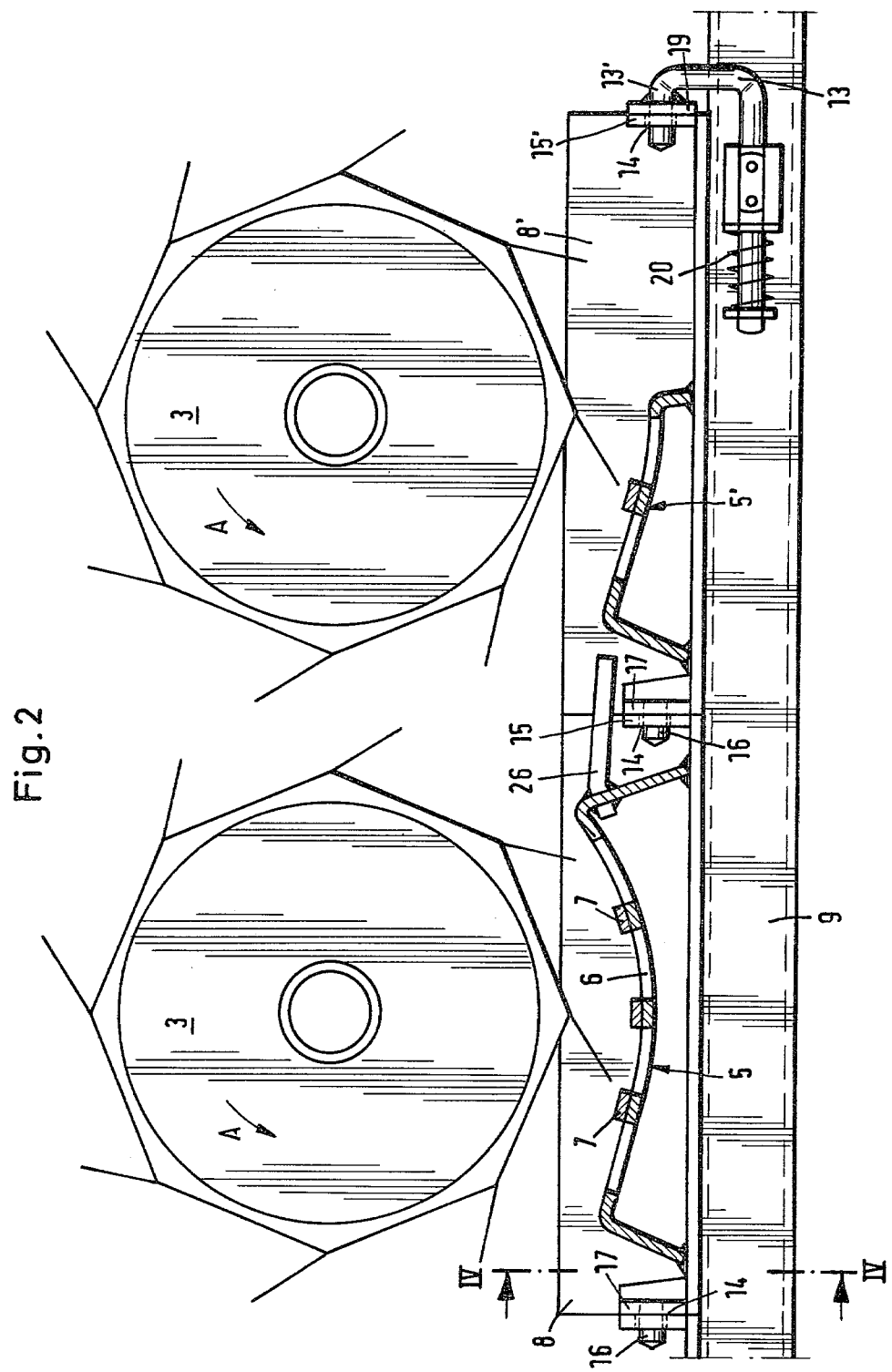
FIG. 2 is an enlarged view of a fragment of the separating part of the harvester thresher shown in FIG. 1.
Figure 3:
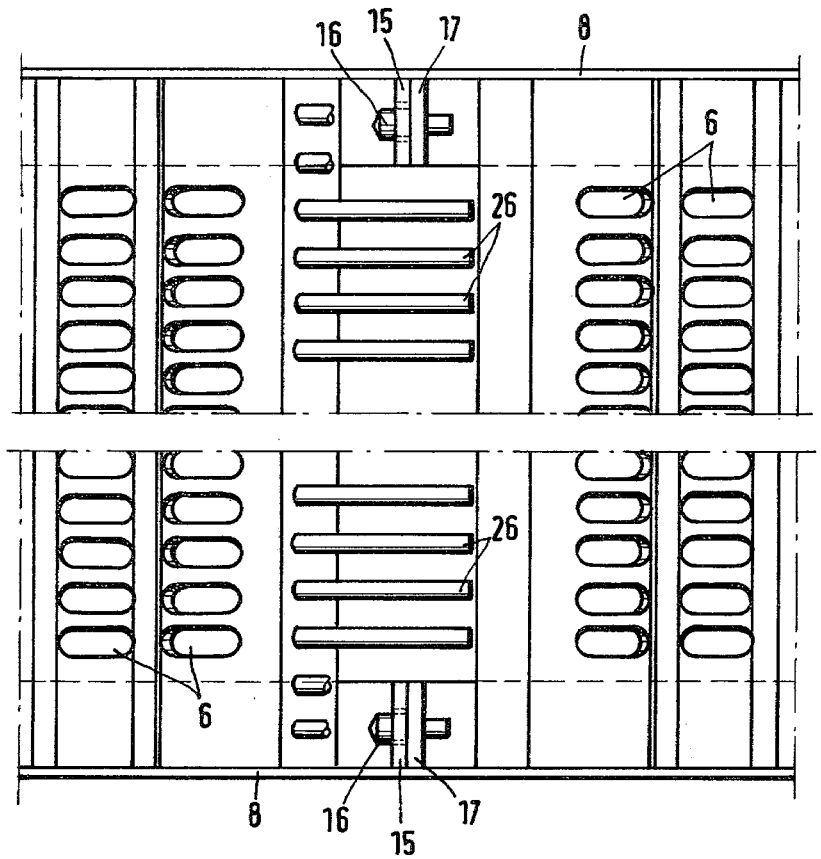
FIG. 3 is a plan view of a fragment of the separating part of FIG. 2, in the region of its connection or centering.
Figure 4:
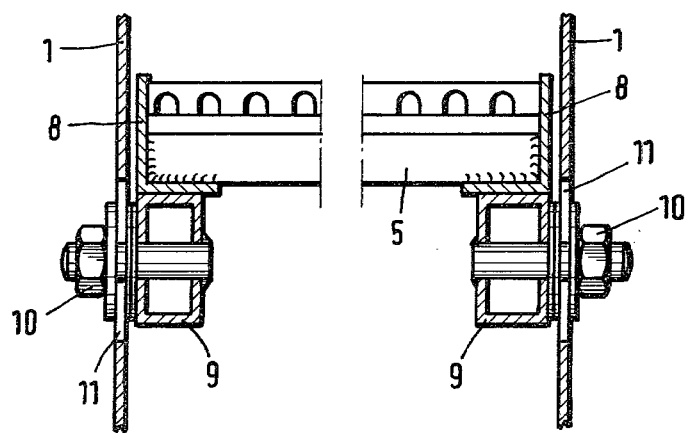
FIG. 4 is a view showing a support of the elements of the harvester thresher, taken along the line IV—IV in FIG. 3.

As can be seen from FIG. 2, the last separating element 5' is shaped as a half of each of the other separating elements, so that the harvest product is discharged downwardly out of the harvester thresher substantially parallel to the supporting members. As known from the art, a transporting bottom 21, a sieve box 24 including an upper sieve 22 and a lower sieve 23, a blower 25, and grain container and transfer screws 28 and 27 are arranged below the separating drums 3 and separating elements 5.

In order to prevent depositing of the harvest products, during their transportation by rotation of the separating drums 3 in direction of the arrow A, a plurality of transferring elements are mounted on the separating elements 5 next to the discharging ends of the latter. The transferring elements may be formed as fingers 26 or metal sheet members having the similar functions. The length of the transferring elements 26 is so selected that they overlap the free space between the neighboring separating elements 5. The last separating element 5', as considered in the transportation direction, has no transferring element. The latter is no longer needed inasmuch as the threshed harvest product is discharged here from the harvester thresher.

During the operation of the harvester thresher in accordance with the prevent invention, the harvest product is first partially threshed by the threshing bucket 2 and the threshing drum 2, and then conveyed between the separating drums 3 and the separating elements 5 provided with the rubbing projections 7 and elongated openings 6. This guarantees that a substantially complete and fine separation of the residual grain takes place. As mentioned above, in order to provide the accommodation to different types of harvest products, the separating elements 5 and the separating drums 3 are exchangeable, and the separating elements 5 are additionally arranged so that they are adjustable in upright direction. The adjustment can be performed after unscrewing of the screws and lifting or lowering of the supporting members 9.

It will be understood that each of the elements described above, or two or more together, may also find a useful application in other types of constructions differing from the types described above.

While the invention has been illustrated and described as embodied in a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising
  threshing means;
  a plurality of separating means arranged adjacent to one another in direction of transportation and each including a separating drum having an axis and a separating element located below said drum, each of said separating elements including a perforated trough-shaped sheet member and a plurality of rubbing projections arranged on said sheet member and extending parallel to said axes;
  means for laterally limiting each of said separating elements and including a plurality of pairs of lateral wall members, each of said pairs of lateral wall members laterally limiting and holding a respective one of said separating elements;
  means for supporting said lateral wall members and including a bar-shaped elongated supporting element extending in the direction of transportation, said separating elements being arranged on and shiftable over said supporting element as units.

2. A harvester thresher as defined in claim 1, wherein said threshing means includes a threshing drum and a threshing bucket arranged below said drum.

3. A harvester thresher as defined in claim 1, wherein said separating drums are arranged parallel to one another.

4. A harvester thresher as defined in claim 1, wherein each pair of said lateral wall members is formed as a stabilized support.

5. A harvester thresher as defined in claim 1, wherein said supporting element includes two supporting members spaced from one another in a direction transverse to the direction of transportation and each supporting one lateral wall member of each of said pairs of lateral wall members.

6. A harvester thresher as defined in claim 5; wherein said supporting members are adjustable in an upright direction.

7. A harvester thresher as defined in claim 6; and further comprising two lateral walls of the harvester thresher, spaced from one another in direction transverse to the direction of transportation, each of said supporting members being mounted on a respective one of said lateral walls adjustable in the upright direction.

8. A harvester thresher as defined in claim 5; wherein each of said supporting members is formed as a box-shaped profiled member having a closed contour.

9. A harvester thresher as defined in claim 1, wherein each two neighboring separating elements are centered relative to and locked with one another via the lateral wall members of the same.

10. A harvester thresher as defined in claim 9, wherein each of said lateral wall members is formed as an angle member.

11. A harvester thresher as defined in claim 1, wherein said separating elements are spaced from on another by a predetermined distance in the direction of transportation; and further comprising a plurality of transferring means each arranged between two neighboring separating elements and extending over at least a portion of said distance.

12. A harvester thresher as defined in claim 11, wherein each of said transferring means is a transferring finger.

13. A harvester thresher as defined in claim 11, wherein each of said transferring means is a transferring sheet member.

14. A harvester thresher as defined in claim 1, wherein said separating elements are exchangeable and have perforations corresponding to the harvest products to be threshed.

15. A harvester thresher as defined in claim 1, wherein said separating drums of said separating means are arranged so that their axes are located in one plane.

16. A harvester thresher, comprising
threshing means;
a plurality of separating means arranged adjacent to one another in direction of transportation and each including a separating drum having an axis and a separating element located below said drum, each of said separating elements including a perforated trough-shaped sheet member and a plurality of rubbing projections arranged on said sheet member and extending parallel to said axes;
means for laterally limiting each of said separating elements and including a plurality of pairs of lateral wall members, each of said pairs of lateral wall members laterally limiting and holding a respective one of said separating elements so that each two neighboring separating elements are centered relative to and locked with one another via the lateral wall members of the same, said lateral wall members being formed as angled members each having ends spaced from one another in the direction of transportation and carrying one end piece provided with a centering pin at one of said ends and another end piece provided with an opening at the other of said ends so as to center and lock said separating elements via the respective lateral wall members; and
means for supporting said lateral wall members and including a bar-shaped elongated supporting element extending in the direction of transportation, said separating elements being arranged on and shiftable over said supporting element as units.

17. A harvester thresher, comprising
threshing means;
a plurality of separating means arranged adjacent to one another in direction of transportation and each including a separating drum having an axis and a separating element located below said drum, each of said separating elements including a perforated trough-shaped sheet member and a plurality of rubbing projections arranged on said sheet member and extending parallel to said axes;
means for laterally limiting each of said separating elements and including a plurality of pairs of lateral wall members, each of said pairs of lateral wall members laterally limiting and holding a respective one of said separating elements;
means for supporting said lateral wall members and including a bar-shaped elongated supporting element extending in the direction of transportation, said separating elements being arranged on and shiftable over said supporting element as units; and
abutment means arranged on said supporting element, and tightening means arranged to tighten said separating elements against one another and against said abutment means.

18. A harvester thresher, comprising
threshing means;
a plurality of separating means arranged adjacent to one another in direction of transportation and each including a separating drum having an axis and a separating element located below said drum, each of said separating elements including a perforated trough-shaped sheet member and a plurality of rubbing projections arranged on said sheet member and extending parallel to said axes;
means for laterally limiting each of said separating elements and including a plurality of pairs of lateral wall members, each of said pairs of lateral wall members laterally limiting and holding a respective one of said separating elements;
means for supporting said lateral wall members and including a bar-shaped elongated supporting element extending in the direction of transportation, said separating elements being arranged on and shiftable over said supporting element as units, said supporting element including two supporting members spaced from one another in a direction transverse to the direction of transportation and each supporting one lateral wall member of each of said pairs of lateral wall members; and
abutment means arranged on said supporting element, and tightening means arranged to tighten said separating elements against one another and against said abutment means.

19. A harvester thresher as defined in claim 18, wherein said abutment means includes two abutment members each mounted on a respective one of said supporting members.

20. A harvester thresher as defined in claim 18, wherein said separating elements together form a separating unit having two ends spaced from one another in the direction of transportation, said tightening means including two tightening members each arranged at a respective one of said ends of said separating unit.

21. A harvester thresher as defined in claim 20, wherein each of said tightening members is formed as a spring-biased bracket.

22. A harvester thresher as defined in claim 1, wherein said separating drums and said separating elements includes a rearmost separating drum and a rearmost separating element as considered in the direction of transportation, said rearmost separating element being spaced from said rearmost separating drum so as to form a gap therebetween and formed so that the harvest product is discharged through said gap from the harvester thresher substantially parallel to said supporting element.

23. A harvester thresher as defined in claim 1, wherein each of said separating elements is provided with a plurality of perforations which are formed as elongated openings.

24. A harvester thresher as defined in claim 1, wherein said separating drums are exchangeable.

* * * * *